United States Patent

[11] 3,633,158

[72] Inventor Jerome D. Heibel
St. Paul, Minn.
[21] Appl. No. 804,577
[22] Filed Mar. 5, 1969
[45] Patented Jan. 4, 1972
[73] Assignee Minnesota Mining and Manufacturing Company
St. Paul, Minn.

[54] TRANSCEIVER-TRANSPONDER-TYPE COMMUNICATIONS SYSTEM
15 Claims, 17 Drawing Figs.

[52] U.S. Cl. .......... 340/34, 250/199, 343/6.5 SS
[51] Int. Cl. .......... G08g 1/09
[50] Field of Search .......... 340/32, 34, 38, 38 P, 38 S, 39, 38 R, 38 L; 325/16, 112; 250/199; 343/6.5, 6.5 SS, 12 MD, 100 CL, 112 TC, 6.5 R, 5 R, 6 R, 5 DP, 6.5 LC, 6.8 LC, 17.1 R, 18 D, 18 B

[56] References Cited

UNITED STATES PATENTS

| | | | |
|---|---|---|---|
| 2,599,368 | 6/1952 | Bruce et al. | 250/199 |
| 3,253,126 | 5/1966 | Baughman | 343/6.5 SS |
| R26,292 | 10/1967 | Bradford et al. | 343/6.5 SS |
| 3,362,025 | 1/1968 | Mori | 343/6.5 SS |
| 3,377,616 | 4/1968 | Auer, Jr. | 343/6.5 SS |
| R26,548 | 3/1969 | Thomas | 250/199 |
| 3,436,540 | 4/1969 | Lamorlette | 340/38 |
| 3,518,415 | 6/1970 | Gutleber | 343/100 CL |

OTHER REFERENCES

" Car Indentifiers Win RR Group Approval," Railway Signalling and Communications, Feb. 1962, pp. 15, 16, 17 and 20.

" Microwaves Identify Freight Cars," by Hamann and Boyd, Control Engineering, March 1962, Vol. 9, No. 3, pages 102- 104.

" 21 Ways to Pick Data off Moving Objects," Robert J. Barber, Control Engineering, October 1963, pg. 82- 86.

*Primary Examiner*—Kathleen H. Claffy
*Assistant Examiner*—Randall P. Myers
*Attorney*—Kinney, Alexander, Sell, Steldt & Delahunt

ABSTRACT: A transceiver-demodulator combination in a transceiver-transponder-type communications system wherein a pulsed beam of radiant energy is encoded to transmit information originating at a transceiver, and modulated by scanning a passive coded transponder with the beam to reflect to the transceiver information originating at the transponder. The information from the transponder is demodulated by producing in response to a pulsed clocking signal representative of the transmitted beam, a first-type signal response for each clocking pulse with which the reflected beam is coincident and a second-type signal response for each clocking pulse for which there is no coincident reflected beam. Successive first-type responses and successive second-type responses are counted and a binary signal is produced in response to a comparison of successive counts whenever a first-type response immediately preceded by a second-type response is produced. The state of the binary signal is determined by the count of the immediately preceding successive second-type signal responses in relation to the count of the adjacent successive first-type signal responses preceding said immediately preceding second-type signal responses.

INVENTOR.
JEROME D. HEIBEL
BY Kinney, Alexander, Sell, Steldt & DeLaHunt
ATTORNEYS INVENTOR.
JEROME D. HEIBEL
BY Kinney, Alexander,
Sell, Steldt & DeLaHunt
ATTORNEYS INVENTOR.
JEROME D. HEIBEL
BY Kinney, Alexander, Sell, Steldt & De La Hunt
ATTORNEYS INVENTOR.
JEROME D. HEIBEL
BY Kinney, Alexander, Sell, Steldt & De La Hunt
ATTORNEYS INVENTOR.
JEROME D. HEIBEL
BY Kinney, Alexander, Sell, Steldt & DeLa Hunt
ATTORNEYS INVENTOR.
JEROME D. HEIBEL
BY Kinney, Alexander,
Sell, Steldt & DeLaHunt
ATTORNEYS INVENTOR.
JEROME D. HEIBEL
BY Kinney, Alexander,
Sell, Steldt & DeLaHunt
ATTORNEYS INVENTOR.
JEROME D. HEIBEL
BY Kinney, Alexander,
Sell, Steldt & De La Hunt
ATTORNEYS

TRANSCEIVER-TRANSPONDER-TYPE COMMUNICATIONS SYSTEM

BACKGROUND OF THE INVENTION

This invention relates generally to transceiver-transponder-type communications and specifically to a transceiver-transponder-type communications system wherein a pulsed beam of radiant energy is used as the communications transfer medium.

The term transceiver as used herein refers to a transmitter and receiver proximate to each other and is not necessarily limited to a transmitter and receiver which share a common housing or to a transmitter and receiver which share common circuit components.

Prior art transceiver-transponder-type communications systems have typically been used solely for obtaining information originating at the transponder location. Examples of various transceiver-transponder-type communications systems are set forth in a two-part article entitled "21 Ways to Pick Data Off Moving Objects," published in the Oct. 1963 and Jan. 1964 issues of *Control Engineering Magazine*, McGraw-Hill New York. In these prior art systems, the transponder is either passive or active. In the passive transponder systems, the scanning beam is modulated by reflecting to the transceiver a portion of the beam in accordance with a coded array of transponder elements. Such a system has a capacity limited to the conveyance of only fixed information in only one direction (from the transponder location to the transceiver location). "-Passive transponders," as used herein, includes the type of sign comprising an encoded array of radiant energy reflective elements, in accordance with which array a radiant energy beam scanned thereacross is modulated.

In the active transponder systems, an information signal which may be either fixed or variable is conveyed by a signal transmission from the transponder to the transceiver in response to a triggering signal from the transceiver. Such a system is also limited to the conveyance of information in only one direction (from the transponder location to the transceiver location) since the signal transmitted by the transceiver carries only a signal capable of triggering the transponder. Active transponders are also generally more complex and costlier to furnish, operate and maintain than are passive transponders.

There is a recognized need for an improved highway communications system as a significant step in improving traffic safety and law enforcement. Ideally, a highway communications system should provide:

1. information of a fixed nature from the roadway to the driver, e.g. speed limits, curves, intersections or route numbers,
2. information of a variable nature from the roadway to the driver, e.g. upcoming weather, highway construction, accident ahead or temporary speed limits,
3. information of a fixed nature from the vehicle to the roadway, e.g. vehicle identification number, and
4. information of a variable nature from the vehicle to the roadway, e.g. driver identification, destination or distress call.

In the prior art, two-way radio-type communications systems have been used for performing these various highway communications functions. These two-way radio-type highway communications systems are costly to install, operate and maintain; use separate transmitters for communicating from the roadside to the vehicle and from the vehicle to the roadside; and are not sufficiently restrictive to limited areas so as not to be subject to signal interference from other electrical devices or so as not to cause signal interference with other electrical devices.

SUMMARY OF THE INVENTION

The present invention provides a transceiver-transponder-type communications system wherein a pulsed beam of radiant energy transmitted from a transceiver is modulated by scanning the beam across a passive coded transponder to reflect and convey back to the transceiver information originating at the transponder. The system also includes a demodulator circuit wherein a reflected beam is demodulated by comparing a received signal which is produced in response to the reflected beam to a pulsed clocking signal which is representative of the transmitted beam. By this comparison a first type of response is provided for each pulse of the pulsed clocking signal with which the received signal is coincident and a second type of response is provided for each pulse of the pulsed clocking signal for which there is no coincident received signal. Successive first-type responses and successive second-type responses are counted and a binary signal is provided in response to a comparison of successive counts whenever a first-type response immediately preceded by a second-type response is provided. The state of the binary signal is determined by the count of the immediately preceding successive second-type signal responses in relation to the count of the adjacent successive first-type signal responses preceding said immediately preceding second-type signal responses. The transmitted pulsed beam of radiant energy may also be encoded to convey information to remote receivers positioned to receive the transmission.

For also demodulating a pulsed radiant energy beam received by the receiver from a remote transmitter, the transceiver-demodulator combination comprises clock pulse generating means for producing a second pulsed clocking signal having a uniform rate essentially the same as the average rate of the first-mentioned pulsed clocking signal; detection means operatively coupled to the receiving means and to the clock pulse generating means for recognizing a received signal produced by the receiving means at essentially the same rate as said second pulsed clocking signal and having a unique predetermined binary recognition characteristic, as a received signal produced in response to a pulsed radiant energy beam from a remote transmitter; and gating means operatively coupled to the detection means and to the comparing means for holding the received signal on a delayed basis, whenever a received signal produced in response to a pulsed radiant energy beam from a remote transmitter is recognized, to enable the comparing means to make said coincidence comparisons between said first-mentioned clocking signal and a said received signal produced in response to a said pulsed radiant energy beam received from a remote transmitter.

In a preferred embodiment, a highway communications system comprises the transceiver-transponder communications system of the present invention. Pulsed light is the preferred communications transfer medium in this embodiment. A vehicle-mounted transceiver transmits to roadside-mounted receivers either fixed information or variable information and receives information from passive coded roadside-mounted transponders scanned by the transmitted beam. Likewise, a roadside-mounted transceiver provides for transmission of either fixed or variable information to a vehicle-mounted receiver and for receipt of fixed information from a passive coded vehicle-mounted transponder scanned by the beam transmitted by the roadside transceiver. The scanning motion is provided by the motion of the vehicle. The roadside passive coded transponders are preferably located on the underside of overhead structures, such as overpasses, so that the field of vision of the transponder elements is not interferred with by climatic conditions such as accumulated snow or by obstructions such as other vehicles.

The transceiver-transponder communications system of the present invention provides an information-conveying capacity whereby a single transmitted encoded beam can be used in conveying information in two directions, either from the transceiver location to a remote receiver location or from the transponder location to the transceiver location. The signal coincidence demodulation method of the present invention advantageously facilitates operation of a pulsed radiant energy transceiver-transponder system at varying scanning speeds without having to separately sense the scanning speed.

It is advantageous to use pulsed light as the communications transfer medium with the present invention especially in a highway communications system. Pulsed light of short duration and high intensity provides a high signal-to-noise ratio at low operating power and high false signal security. Light beams can be dimensioned and directed for confinement to prescribed areas so as to avoid signal interference. Light communications, as opposed to radio-type communications, do not interfere with, nor are they interfered with by, the radio-type communications which are already a part of the surrounding environment. Additionally, a very high instantaneous power output is provided. Furthermore, light can be directed in a more restricted beam than can radio waves. Also the problem of interfering harmonics and ignition noise are not factors in the pulsed-light system as they sometimes are in radio-type communications systems. Light includes vibrations in the infrared and ultraviolet spectra.

An advantage of a pulsed-light highway communications system is that the amount of radio-type communication in an environment already polluted with such is alleviated; and yet pulsed-light communication is compatible with present electronic communications equipment. Another advantage is that by using passive coded transponders to convey fixed information to vehicles, the need for active roadside transmitters to convey the same information is considerably reduced. Also, this system may provide information unique to each lane of traffic.

DESCRIPTION OF THE PREFERRED EMBODIMENT

Figure 1:
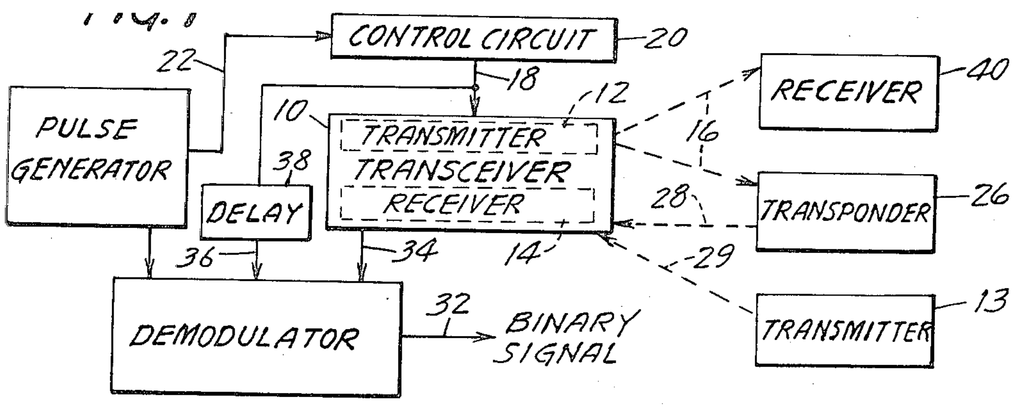
FIG. 1 is a block diagram illustrating the present invention.
Figure 2:
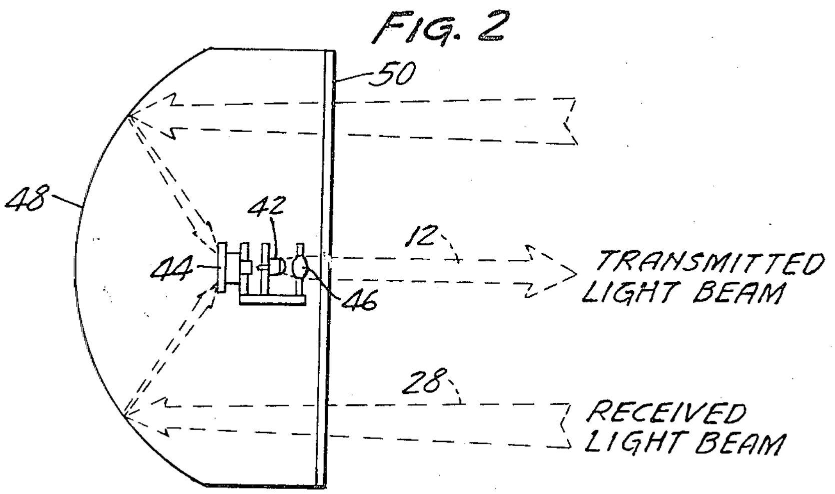
FIG. 2 is a cutaway elevational view of a transceiver structure used in a preferred embodiment of the present invention.

The transceiver 10 comprises a transmitter 12 and a receiver 14 which are positioned proximate to each other in a given vicinity. A radiant energy beam 16 is transmitted from transmitter 12. This beam 16 is selectively encoded to convey information in response to an encoded pulsed signal 18 from control circuit 20, in which circuit 20 a pulsed signal 22 from pulse generator 24 is encoded. The transmitted beam 16 is scanned across a passive coded transponder 26 to provide a modulated information-conveying beam 28 which is reflected to the receiver 14. This modulated beam 28 is demodulated by a demodulator 30 which provides a binary signal 32 in response to a comparison of a received signal 34 which is produced in response to the modulated beam and a pulsed clocking signal 36 which is provided in response to the encoded pulsed signal 18 and is thereby representative of the transmitted beam 16. Depending on the distance between the transceiver 10 and the transponder 26, the encoded pulsed signal 18 to which the pulsed clocking signal 36 is responsive may be slightly delayed by delay circuit 38 for approximately the time it takes for the transmitted beam 16 to reach transponder 26 and for the modulated beam 28 to reach receiver 14. However, when the transceiver is closely positioned, such a delay is unnecessary. The means by which the demodulator 30 provides the binary signal 32 in response to the comparison of the received signal 34 and the pulsed clocking signal 36 will be described hereinafter.

In addition to being scanned over the transponder 22, the transmitted beam 16 may also be received by a receiver 40 located remotely from transceiver 10 in position to receive beam 16.

In the preferred embodiment of this invention, high-intensity, short duration, pulsed-light is used as the communications transfer medium. The intensity of the light should be high enough to provide a reliable signal-to-noise ratio but not so high as to be injurious to health. The pulse duration is short to conserve power and to provide a greater security against false signals through a very short interval of possible pulse coincidence and to provide a high signal-to-noise power ratio during the duration of each pulse.

In a preferred embodiment, the transmitter includes a light source, such as a gallium-arsenide injection laser diode 42, and the receiver includes a photodetector, such as a silicon photodiode, mounted coaxially with the laser injector diode 42. The gallium-arsenide injection laser diode is capable of providing rapid pulse rates (e.g. 1,000–5,000 p.p.s.) and extremely short pulse widths (about 0.2 microseconds) at very high peak light output power. Because of the low duty cycle the average power input is quite low for such an intense outgoing light pulse. At a typical efficiency of 0.5 percent, the average power input for 50 watts peak output is only 2 watts. Silicon photodiodes have a typical sensitivity of 0.5 microampere per microwatt of incident light energy, and a typical response time of less than 0.01 microsecond, thereby permitting practical reception of low-level pulses of light having a 200-nanosecond or less duration. A lens 46 is positioned to direct and shape the transmitted light beam 12. A reflector 48 is positioned to gather the received light beam 28 and to focus the received light beam 28 on the surface of the photodiode 44. The transceiver components are protected by transparent window 50.

The injection laser diode 42 receives the encoded pulsed signal 18 which encodes the transmitted light beam 16 from control circuit 20. The transmission rate is controlled by the pulsed signal 22 from pulse generator 24. This pulsed signal 22 is encoded to convey discrete information by control circuit 20 in accordance with one of different discretionary encoding techniques: (1) shifting the time spacing of the pulses with respect to each other; (2) varying the frequency of the pulses; (3) extracting some of the pulses in a pulse train; or (4) varying the pulse widths. In the preferred embodiment, a train of pulses 22 each pulse having an approximate 200-nanosecond duration are received by the control circuit 20 at a rate of 5,000 pulses per second from the pulse generator 24. In the control circuit 20, the pulsed beam 22 is encoded by the time-spacing shifting scheme whereby a pulse is delayed by 50 nanoseconds for a binary 1 and not delayed for a binary 0.

The transponder 26 is a passive coded array of retroreflective elements 50, such as "Scotchlite" brand reflective sheeting No. 3270 manufactured by the Minnesota Mining and Manufacturing Company of Saint Paul, Minnesota. In response to the light beam 16 transmitted from the transceiver 10 being scanned across the transponder 26, the transceiver receiver 14 received a reflected light beam 28 which has been modulated in accordance with the coded array of the transponder 26. A digital binary code is used. The retroreflective elements 50 of the transponder 26 are arranged in such a way that the coded sequence of binary 1's and 0's is received by the transceiver receiver 14 notwithstanding variations, within limits, of the scanning speed and acceleration. In order to so provide that the coded sequence is so received notwithstanding such variations, the various retroreflective elements 50 and nonreflective elements 52 are so dimensioned and so spaced that each retroreflective element 50 reflects to receiver 14 at least a predetermined quantity of a transmitted beam 16 being transmitted at a rate ranging between predetermined maximum and minimum rates and being scanned at a speed not in excess of a predetermined maximum speed; and that each of the nonreflective elements fails to reflect to receiver 14 at least a predetermined quantity of a transmitted beam 16 being transmitted at a rate ranging between predetermined maximum and minimum rates and being scanned at a speed not in excess of a predetermined maximum speed. Such dimensioning and spacing must also take into account the beam size and the particular type of encoding provided by control circuit 20, whereby there may be variations in pulse width, pulse density, pulse rate and pulse spacing, so that, notwithstanding such variations in the encoded pulsed beam 16 characteristics, the predetermined minimum quantities are reflected or not reflected in accordance with the coded array of the transponder 26.

Figures 3, 4:
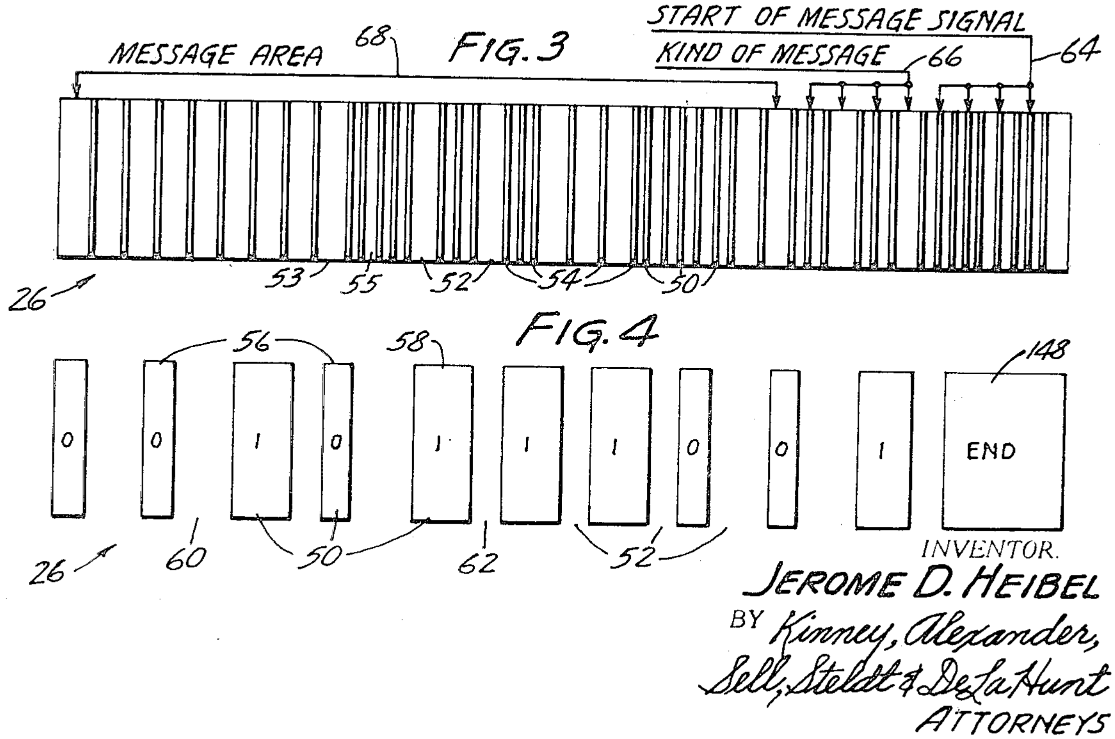
FIG. 3 is a transponder used in a preferred embodiment of the present invention, which transponder bears a coded array of reflective and nonreflective elements in accordance with a "return-to-one" code scheme.
FIG. 4 is a transponder used in a preferred embodiment of the present invention, which transponder bears a coded array of reflective and nonreflective elements in accordance with a variable element width code scheme.

Two preferred schemes of coding the array of transponder elements 50 and 52 will be described. Both schemes provide for the transponder being scanned at variable rates of speed and acceleration. The first scheme illustrated in FIG. 3 is referred to herein as the "return-to-one" coding scheme. In this scheme evenly spaced clocking retroreflective elements 54 are interspersed with the information providing retroreflective and nonreflective elements 50 and 52 which are positioned and dimensioned in accordance with a pulse extraction-type code. In the second scheme illustrated in FIG. 4, the widths of the retroreflective and nonreflective elements 50 and 52 are varied to indicate binary 1's and 0's.

As stated, the first code scheme used pulse extraction. Extraction is accomplished by omission of a retroreflective element 50, which signifies a binary 0 by not reflecting light back to the transceiver receiver 14 while a return of light signifies a binary 1. The received reflected light beam 28 contains successive pulses of returned light pulses and intervals of no light, both of varying lengths, and will be demodulated as explained hereinafter to extract the information contained in the sequence.

The retroreflective elements 50 and 54 and nonreflective elements 52 are of such width and spacing that when scanned at a predetermined maximum scanning speed by a light beam having a given beam size and a pulse rate ranging between predetermined maximum and minimum rates and encoded to contain at least a minimum quantity of light for each given interval, each retroreflective element 50 or 54 reflects at least a minimum quantity of light, and each nonreflective element 52 receives and does not retroreflect a quantity of light measurably larger than this minimum quantity. In one embodiment, 100 miles per hour (approximately 160 km. per hour) is chosen as the maximum scanning speed and the pulse rate of a transmitted beam is 5,000 pulses per second. At a maximum speed of 100 miles per hour (approximately 160 km./hr.), there are approximately 34 pulses per foot (30.5 cm.) of travel. For a beam width of 0.25 inch (6.3 mm.), the minimum retroreflective element 50 or 54 is 0.25 inch (6.3 mm.) and minimum space between retroreflective elements 50 and 54 which corresponds to the minimum width of nonreflective elements 52 of 0.75 inch (1.9 cm.). For this embodiment, a retroreflective element 50 or 54 of 0.3 inch (7.5 mm.) and a minimum center-to-center retroreflective element-to-retroreflective element spacing of 1.2 inch (3.0 cm.) is used. The "return-to-one" system is used, so each bit of information requires two retroreflective panels, one for clocking, and one for information. Each bit of information therefore requires a code sign length of 2.4 inches (6.0 cm.), making a 10-character six-bit code message 12 feet (approximately 3.6 m.) long. As will be seen hereinafter, however, there is some modification downward from this figure.

The second code scheme which is a variable element width code scheme is illustrated in FIG. 4. When scanned from left to right, this coded series array of retroreflective elements 50 represents the binary number 0010111001. All binary 0's are short marks 56 and all binary 1's are long marks 58. The spacing of the leading edges of all marks is uniform; therefore the blank spaces 52 between marks are not uniform in length. The space 60 following a binary 0 element 56 is longer than the 0 element 56 and the space 62 following a binary 1 element 58 is shorter than the 1 element 58.

The photodiode 44 of the transceiver receiver 14 is connected to a demodulator circuit 30 for demodulating the light beam 28 received from the transponder 26. A received signal on line 34 is led from the photodiode 44 to the demodulator circuit 30 in response to the sensing of light pulses by the photodiode 44.

Figure 5:
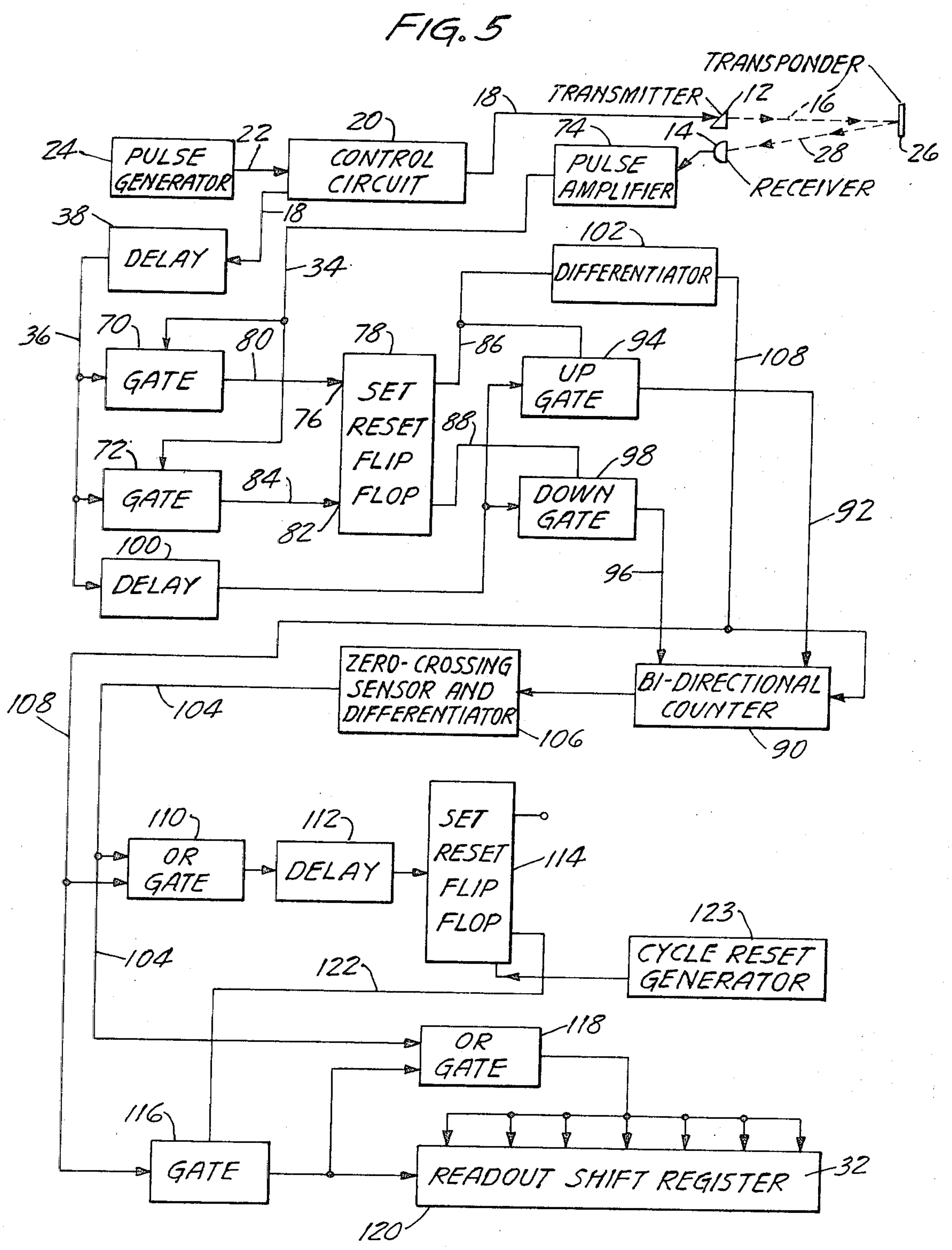
FIG. 5 is a block diagram illustrating the transceiver and transponder elements and a demodulator circuit for demodulating a received reflected beam modulated in accordance with the "return-to-one" code scheme with which the transponder of FIG. 3 is coded.

The demodulator circuit 30 in which the received signal on line 34 is demodulated is a logic circuit. Referring to FIG. 5, the demodulation of a received signal on line 34 responsive to a light beam 28 reflected from a transponder 26 coded in accordance with the aforementioned first code scheme is described. As set forth above, the code element sizes and spacing are chosen in accordance with a transmitted beam 16 pulse rate of 5,000 p.p.s. and a maximum scanning speed of 100 miles per hour (160 km./hr.). Signal coincidence is used to determine whether or not each transmitted light pulse of beam 16 is returned. Very high speed logic circuit elements are used to permit recognition of overlap of portions of transmitted light pulses 16 having 200-nanosecond pulse durations and corresponding received light pulses 28.

The use of this signal coincidence principle not only simplifies the demodulating logic, but provides a high degree of false-signal security since a received signal on line 34 is not recognized unless paired with a pulsed clocking signal on line 36 essentially coincident with the received signal on line 34.

The demodulation circuit 30 operates as follows: The signals on line 18 from the control circuit which drive the injection laser diode 42 are in addition led as a pulsed clocking signal through a delay circuit 38 where they are delayed slightly and then led to the input of the control gates 70 and 72 so as to be present at the control gates 70 and 72 for a time overlapping the duration of corresponding received signals on line 34 which are led to the control gates 70 and 72 from the receiver 14. Delay circuit 38 is eliminated when the transceiver 10 and transponder 26 are close to each other such as in the case where a transponder is mounted on the underside of a highway overpass.

A light pulse striking a retroreflective portion 50 or 54 of a transponder 26 is returned to the receiver 14, amplified by the pulse amplifier 74, and directed on line 34 to gate 70 to enable gate 70 to send the pulsed clocking signal from line 36 to the SET input 76 of the set-reset flip-flop 78 on line 80. This amplified signal on line 34 is simultaneously directed to gate 72 to inhibit gate 72 from sending the delayed electrical clocking signal from line 36 to the RESET input 82 of the set-reset flip-flop 78 on line 84. Therefore, any time a light pulse is received by the receiver 14 corresponding to a light pulse transmitted by transmitter 12, a 1 output level appears on line 86 and a 0 output level appears on line 88. On the other hand, when a light pulse is transmitted by transmitter 12 and no corresponding pulse is received by receiver 14, the gate 70 is inhibited, the gate 72 is enabled, and a 0 output level appears on line 86, and a 1 output level appears on line 88.

This circuitry therefore changes the 0 and 1 output level combinations on lines 86 and 88 each time there is a change in the scanned coded transponder elements 50, 52 and 54 from reflective to nonreflective, or from nonreflective to reflective. In order to distinguish the nonreflective elements 53 representing binary 0s from the nonreflective elements 55 used in distinguishing and detecting successive retroreflective elements 52 and 54, a high-speed binary bidirectional counter 90 is used. When the set-reset flip-flop 78 is set to provide a 1 signal on line 86, counter 90 is stepped to count up the number of signals received on line 92 from UP gate 94, and when set-reset flip-flop is reset to provide a 1 signal on line 88, the counter 90 is stepped to count down the number of signals received on line 96 from DOWN gate 98. The pulsed clocking signal on line 36 is delayed by delay circuit 100 so as to arrive at UP and DOWN gates 94 and 98 at least partially coincidental with the signals on lines 86 and 88 from set-reset flip-flop 78. If the counter 90 passes zero, it means that the blank space 52 encountered by the scanning light beam 16 represents a binary 0 at that point on the coded array of the transponder 26. The counter 90 is reset to zero through the level change differentiator 102 when the next retroreflective element 50 or 54 is scanned. Each time the differentiator 102 so resets the counter 90, a 1 signal pulse is also produced on line 108.

Each time the accumulated count in counter 90 goes negative by passing through zero, a 1 pulse signal is produced on line 104 by zero-crossing sensor and differentiator 106. Each such 1 pulse signal on line 104 represents a coded 0 element. The pulse signals produced on line 108 by level change differentiator 102 on the other hand represent either a coded 1 element or a clocking 1 element, so it is necessary to eliminate the 1 pulse signals on line 108 representing clocking 1 elements. To so eliminate these 1 pulse signals representing clocking 1 elements, the 1 pulse signals on line 104 representing coded 0 elements 55 and the 1 pulse signals on line 108 representing coded 1 elements 50 and clocking 1 elements 54 are directed through an OR gate 110 and delay circuit 112 to a set-reset flip-flop 114 which starts in the reset position and which changes position in response to each received 1 pulse signal thereby enabling gate 116 only when flip-flop 114 is in the reset position, so that all the clocking 1 pulses representing clocking 1 which follow 1 pulses representing coded 1 elements or coded 0 elements are disregarded.

Either 1 pulses on line 108 representing a coded 1 element or 1 pulses on line 104 representing a coded 0 element received by OR gate 118 step a readout shift register 120 in which the demodulated binary signal 32 is stored. Gate 116 provides binary 1's in response to a 1 signal representing a coded 1 element on line 108 as an input to the register when it is enabled by a 1 signal on line 122 from flip-flop 114. A binary 0 is produced in readout register 120 by gate 118 stepping the register 120 in response to a 1 signal representing a coded 0 element being received on line 104 at such time as there is no 1 signal on line 108 to be shifted through gate 116 into register 120. The cycle reset generator 123 resets flip-flop 114 to the reset position at a predetermined time after a coded message is received.

Figure 6:
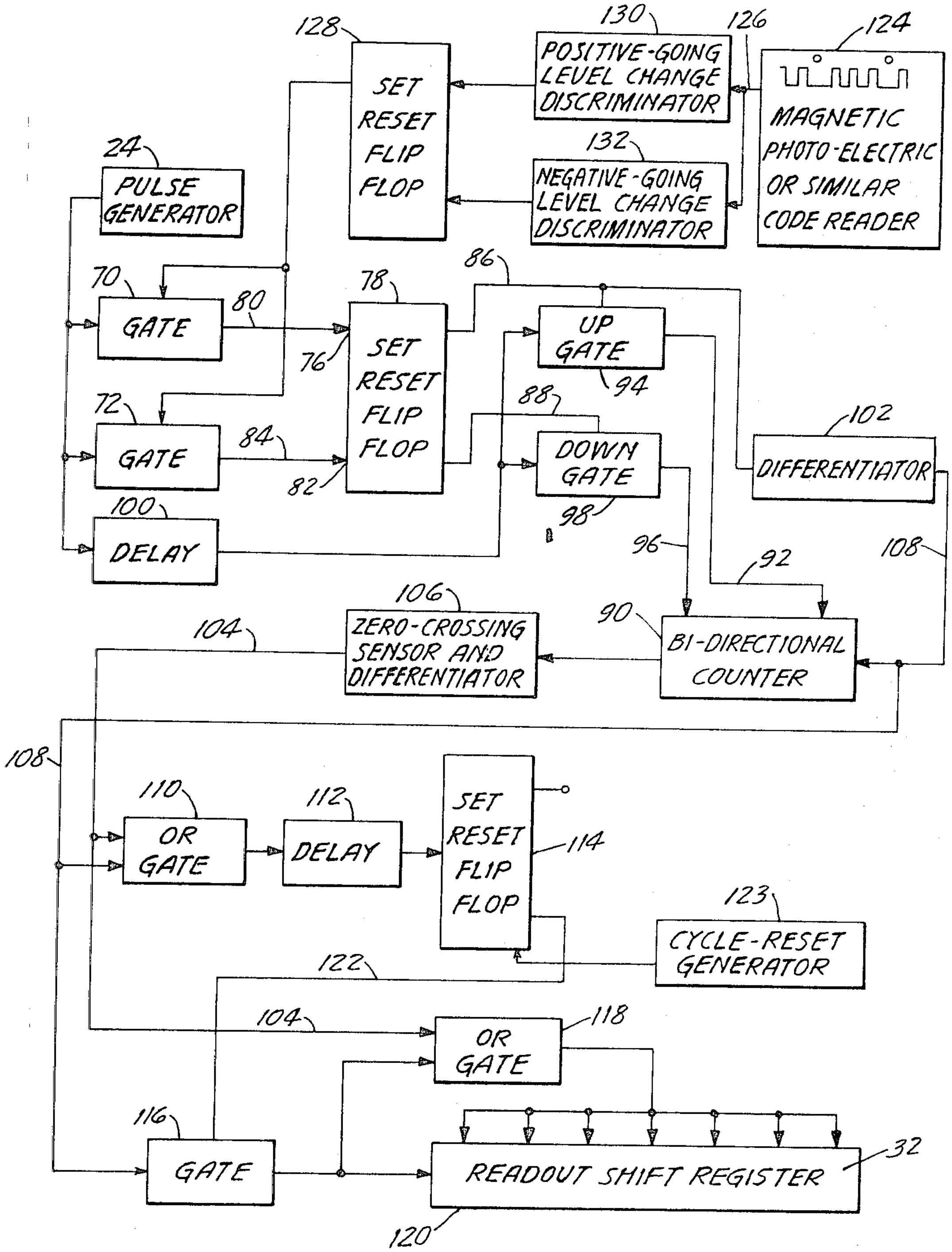
FIG. 6 is a block diagram illustrating a code-reading system using the demodulator circuit illustrated in FIG. 5.

The above description covers means for demodulating a pulsed-light beam reflected from a passive coded transponder. The self-clocking principle described is, however, also applicable to other code-reading systems (see FIG. 6) where the speed of scanning may be nonuniform such as in photoelectric or magnetic card readers 124 where the card is moved by hand or by a relatively crude mechanical device. In these cases the presence of a continuous signal on line 126 denotes a 1 and its absence denotes a 0, and again means are needed for discarding the 1's which are used to separate coded bits of information and to recognize the coded 1's and 0's. Reference to the logic diagram of FIG. 6 covering such systems will show that the pulse generator 24 is used in this case only to provide the clocking functions required for demodulation and that an additional flip-flop positive-going level change discriminator 130 and negative-going level change discriminator 132 are used to record when, and in which direction, a signal on line 126 changes.

Demodulation using either the circuit of FIG. 5 for demodulating a pulsed-light beam reflected from a passive coded transponder 26 or a signal from a nonuniform scanning card reader 124 are independent of the speed of scanning or reading except to the extent of requiring reasonable uniformity of speed (i.e. minimum acceleration) between the scanning of any two successive coded elements. In the case of the motor vehicle, with its great mass/bit-interval ratio, this is not a significant problem. In the case of hand-actuated card readers, it is necessary to make coded 0 spaces significantly large and it may be necessary to recognize such coded 0's by sensing a given negative number in the counter rather than by merely sensing a zero-crossing.

Use of the zero-crossing sensor and differentiator 106 conserves transponder 26 space depending upon how many 0's are coded, as no additional blank space is required after the 0 is recognized. It was pointed out earlier that a length of 2.4 inches (approximately 6.1 cm.) is required for each binary signal bit. This length is necessary for recognizing a coded 1. However, since a coded 0 can be recognized as such as the counter 90 count crosses zero, the spacing interval between clocking elements 54 can be eliminated each time a coded 0 bit is used.

A typical array of code elements for the transponder is shown in FIG. 3. The transponder 26 is scanned from right to left. The first four information bit areas 64 are the "start of message signal" area 64, and contain four coded 1's. The next four information bits scanned are the "kind of message" areas 66 which in FIG. 3 contain the binary signal 0101. The remaining area of the transponder 26 is the message area 68, which in FIG. 3 contains the binary signal: 0011100010101100000000. In this case the number of code spaces on the sign is 30 and the transponder length is therefore 6 feet (1.8 m.).

Using the second code scheme referred to above and illustrated in FIG. 4, the coded array of variable-width code elements is scanned from left to right by the transmitted beam 16 at a speed which does not change more than the ratio between any two adjacent marks and spaces during one mark interval.

Figure 7:
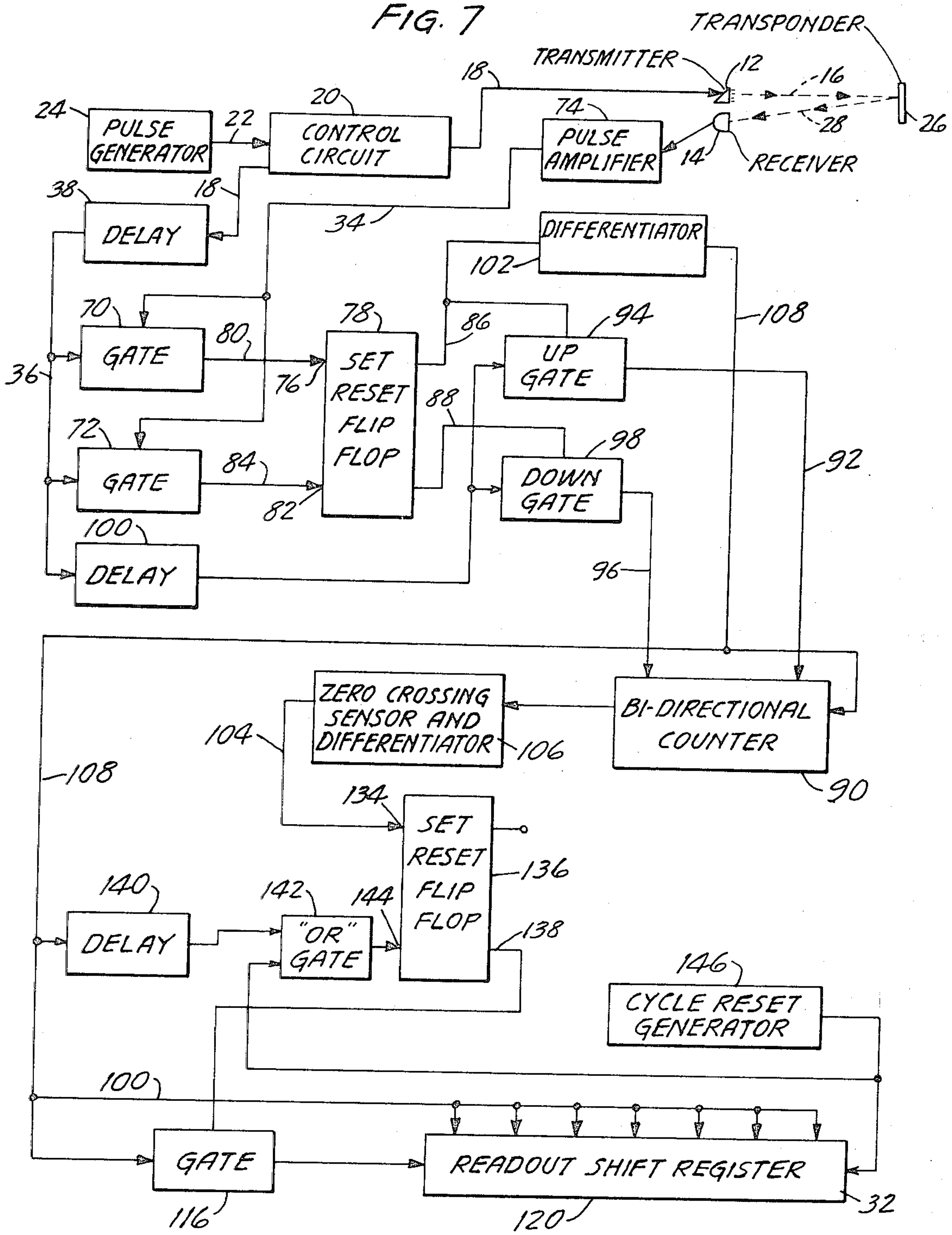
FIG. 7 is a block diagram illustrating the transceiver and transponder elements and a demodulator circuit for demodulating a received reflected beam modulated in accordance with the variable element width code scheme with which the transponder of FIG. 4 is coded.

The circuit of FIG. 7 is used to demodulate a beam 28 remodulated in accordance with this second code scheme. In the same manner as the circuit of FIG. 5, a 1 pulse signal is produced on line 108 each time a retroreflective element 50 is scanned and a 1 pulse signal is produced on line 104 each time a nonretroreflective element 60 which is longer than the next preceding retroreflective element 56 is scanned. The 1 pulse signal on line 104, which, of course, indicates that a coded 0 has been read, is led to the set input 134 of set-reset flip-flop 136. The flip-flop is thus set so that a 0 output level appears at output 138 of flip-flop 136 thereby inhibiting gate 116 from shifting the next 1 signal on line 108 into readout shift register 120 when the next retroreflective element 50 is scanned, and the resulting 1 pulse signal on line 108 steps register 120. As a result, a coded 0 is added to binary signal 32. Flip-flop 136 is reset by the next 1 pulse signal on line 108 being led through delay circuit 140 and OR-gate 142 to the reset input 144 of flip-flop 136, thereby enabling gate 116. If the next nonreflective element 62 is shorter than the next preceding retroreflective element 58, thereby indicating a coded 1, gate 116 remains enabled and when the next retroreflective element 52 is scanned to produce a 1 pulse signal on line 108 this 1 pulse signal on line 108 steps the register 120 and shifts the 1 pulse into the register 120 to add a coded 1 to the binary signal 32.

A cycle reset generator 146 is provided to clear the register and to reset flip-flop 136 at a predetermined time after reading a code, so that the next modulated beam 28 may be demodulated.

It will be noted that with the logic system shown the first signal recorded is always a 1, so this fact is taken into consideration in constructing each code message and in the design of the demodulator circuit 30. Also, in the construction of each coded transponder 26, retroreflective end element 148 must always be placed at the end of the message to provide the timing signal necessary to determine if the preceding mark was a 0 or a 1.

Figure 8:
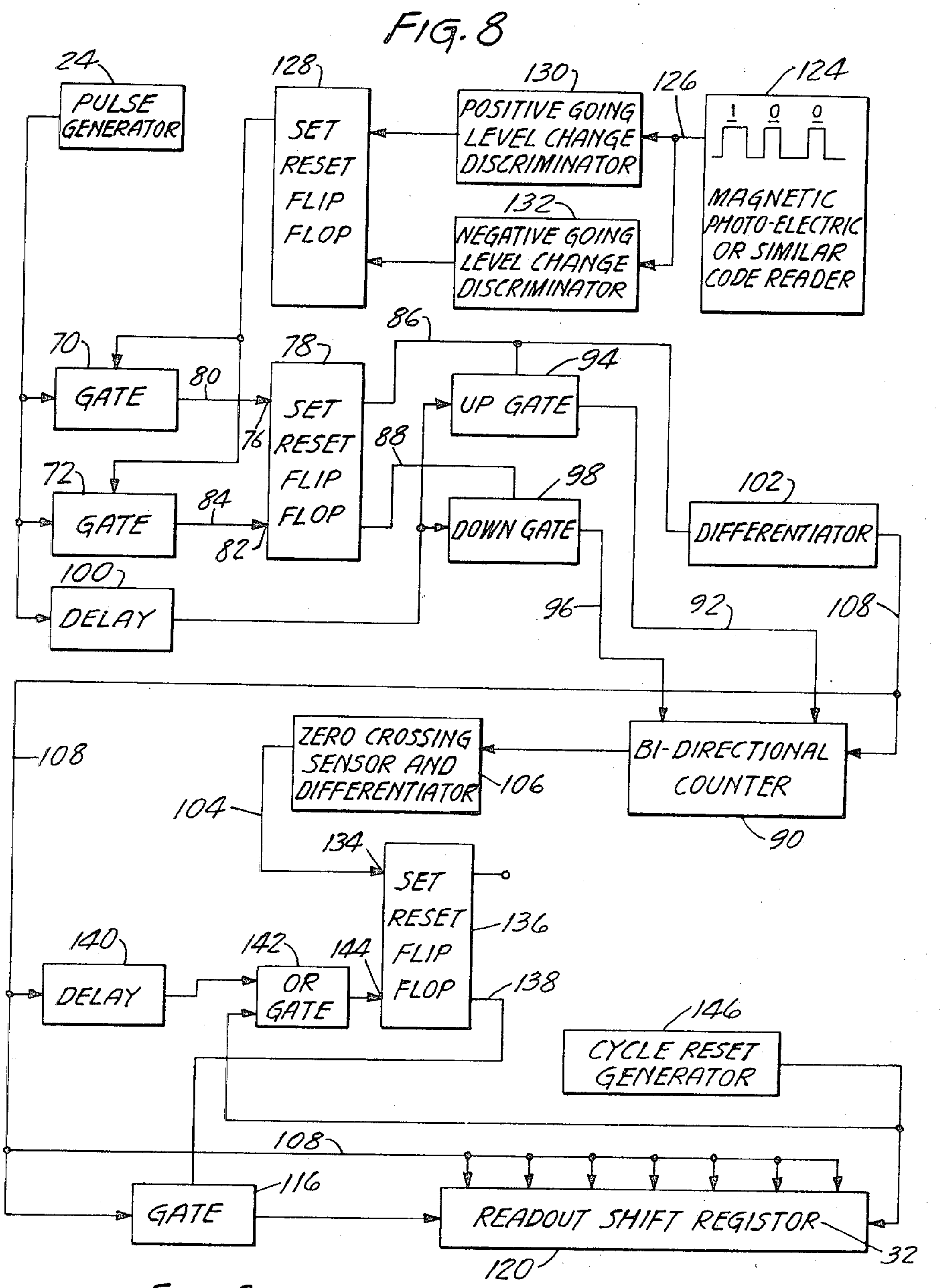
FIG. 8 is a block diagram illustrating a code-reading system using the demodulator circuit illustrated in FIG. 7.

As with the first code scheme, the principle of this code scheme is also applicable to other code-reading systems (see FIG. 8) where the rate of scanning may be nonuniform. The circuit components of FIG. 8 are of the type described in reference to the circuits of FIGS. 6 and 7 and operate in the same manner as described with reference thereto.

A preferred embodiment of the present invention is its use in a highway communications system, Such an embodiment is described with reference to FIGS. 9 through 13. Vehicles 149 on the highway carry a transceiver 150 with their associated electronic circuits.

Figure 9A:
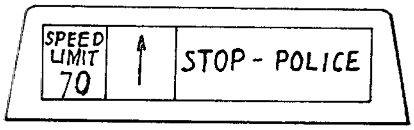
FIGS. 9A and 9B are illustrations of panel displays of highway information conveyed from a roadside transponder to a vehicle transceiver in accordance with the communications system of the present invention.
Figure 10:
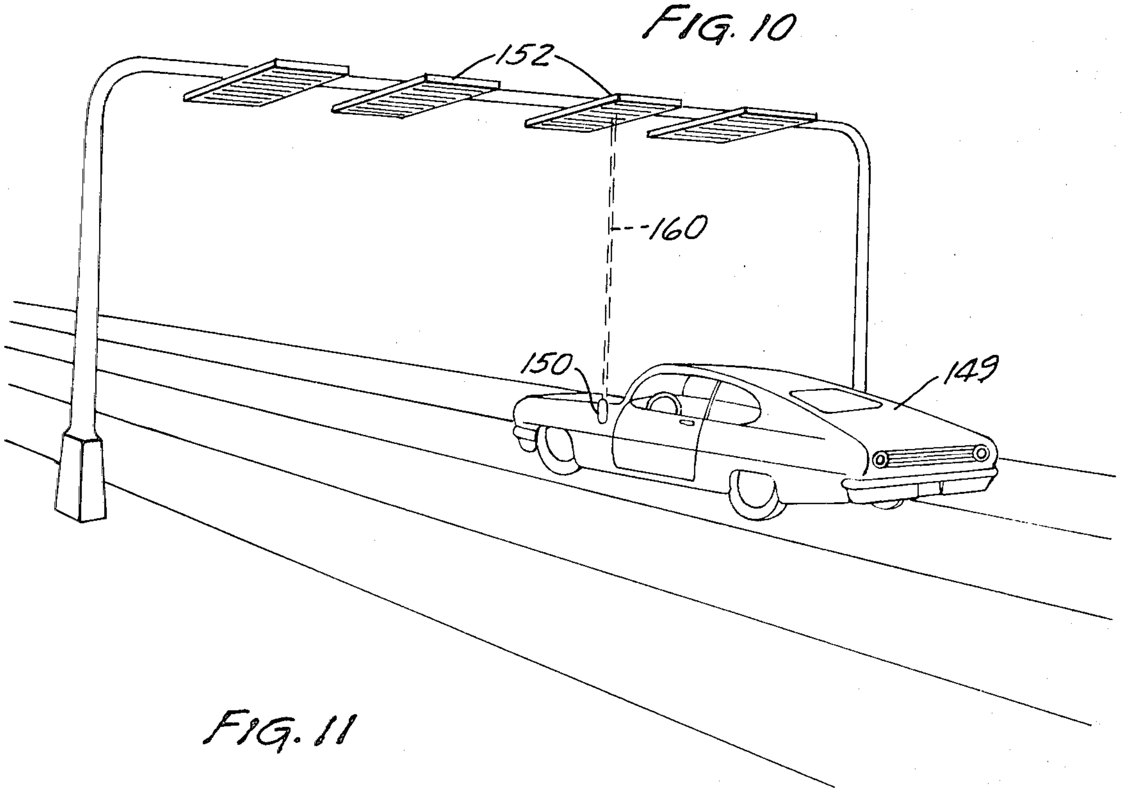
FIG. 10 illustrates a vehicle-mounted transceiver scanning a transmitted beam of light over an overhead roadside passive coded transponder.
Figure 11:
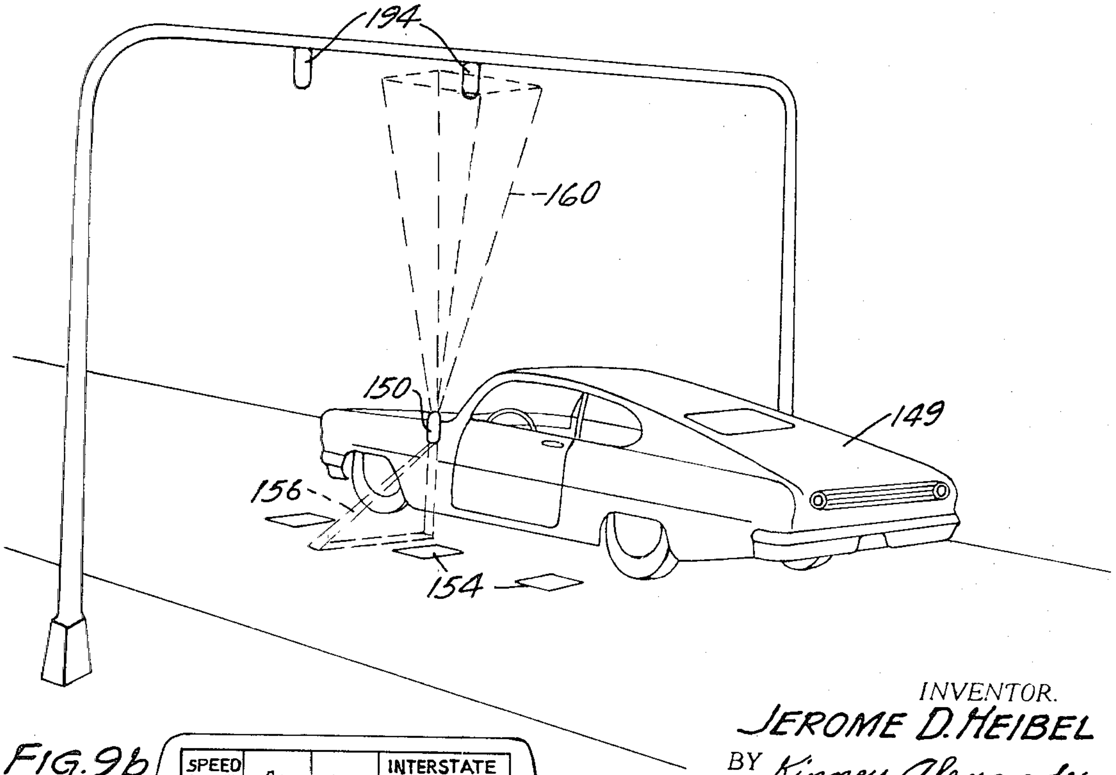
FIG. 11 illustrates a vehicle-mounted transceiver scanning a transmitted beam of light to an overhead remote roadside receiver to convey discrete information to the roadside and simultaneously scanning a beam over a coded transponder comprising pavement delineators to convey information from the roadside to the vehicle with both beams originating from the same transmission.
Figure 9B:
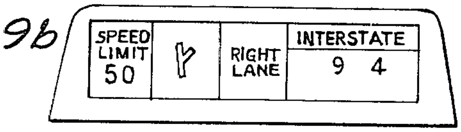

The means through which information is transferred to the driver include visual displays such as shown in FIG. 9A and 9B, "Heads-Up" displays in the windshield itself, in which a transparent colored light image is projected onto the windshield, aural signals, direct or tape programmed voice, and direct automatic control of such variables as speed and direction with driver-override capability.

The in-car display panel is arranged to hold some messages until changed by the next-received same-type message, and to hold others for only a limited length of time. Examples of the former are speed limit and present route number. A warning message such as a curve or intersection is held for a fixed time such as 10 seconds. A stop signal may replace the speed limit signal until the car moves on, at which time the previous speed limit signal may be redisplayed.

Transponders constructed as described above for the preferred pulsed-light embodiment are positioned along the roadway so that they may be scanned by the vehicle-mounted transceivers. Transponders 152 are mounted over each lane of traffic (FIG. 10), and retroreflective traffic lane delineators 154 are set in the pavement (FIG. 11), These transponders 152 and 154 provide means of conveying fixed information such as highway advisory messages to a passing vehicle by returning portions of the pulsed light beams transmitted from the vehicle in accordance with the code of the retroreflective array. As stated above, the proper sequence of binary 1's and 0's is returned to the vehicle regardless of variations in its speed within predetermined limits.

A pulsed-light beam 156 directed downward from the left side of the vehicle 149 scans the retroreflective pavement lane delineators 154. In one embodiment, the delineators 154 are evenly spaced so that the light pulses returned to the transceiver are indicative of the vehicles's speed. Automatic comparison of the rate at which these light pulses are so returned with a fixed "clock" in the vehicle will provide an indication of the amount of deviation from proper speed, and provide for automatic speed control. In another embodiment, retroreflective delineators 154 are placed between those used for speed control to provide message transmission to the vehicle in the same manner as do the overhead mounted transponders 152 coded in accordance with the first code scheme.

Through a unitized optical system of lenses and reflectors, a single injection laser diode is arranged in a transceiver 158 to project beams of light upward 160, downward 162, forward 164, and backward 166, and to the left 168 of the vehicle on which it is mounted—and to accept direct or reflected beams back along the same paths and focus them on a coaxially mounted photodiode detector. The light beams are shaped to provide narrow spans required for scanning code markings and wider fan-outs to provide time for reading direct transmissions.

Figure 12:
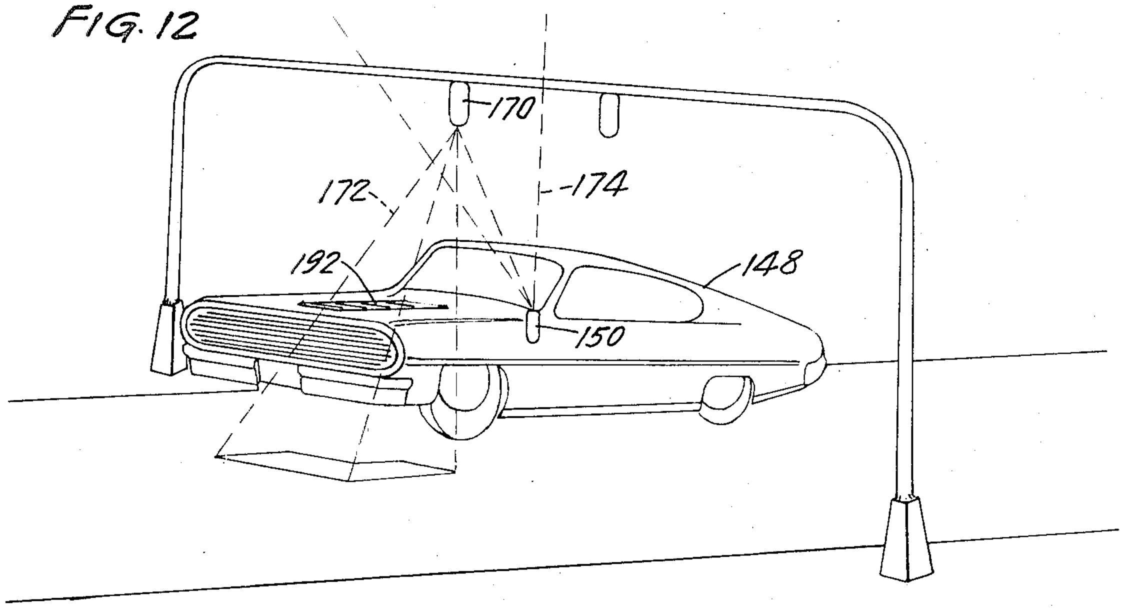
FIG. 12 illustrates a vehicle transceiver and a roadside transceiver positioned for two-way communication between the vehicle and the roadside; a passive coded transponder is also mounted on the vehicle.
Figure 13A:
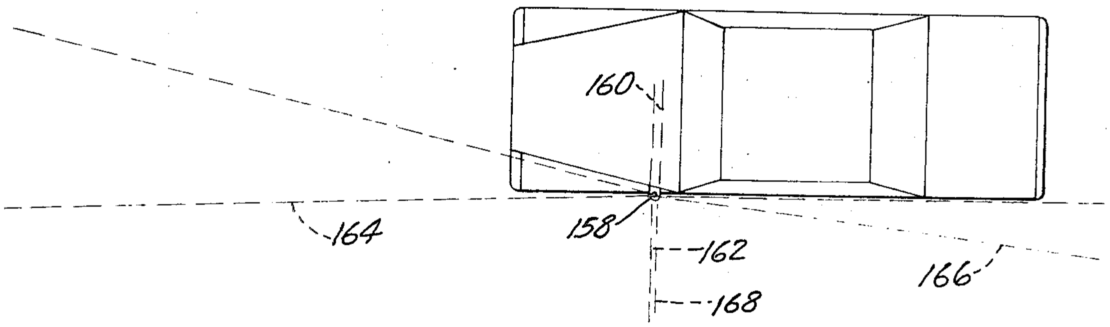
FIGS. 13A, 13B and 13C illustrate a vehicle transceiver for directing a beam originating from a single encoded transmission in multiple directions.
Figure 13B:
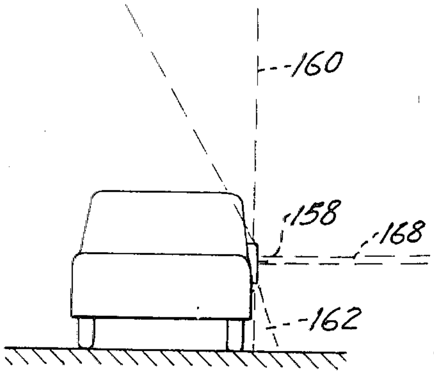
Figure 13C:
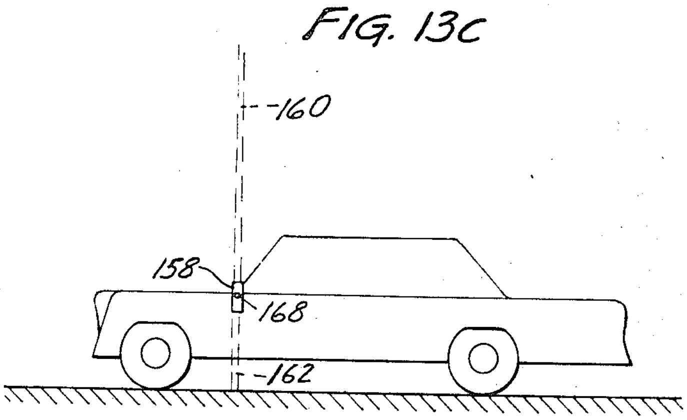
Figure 14:
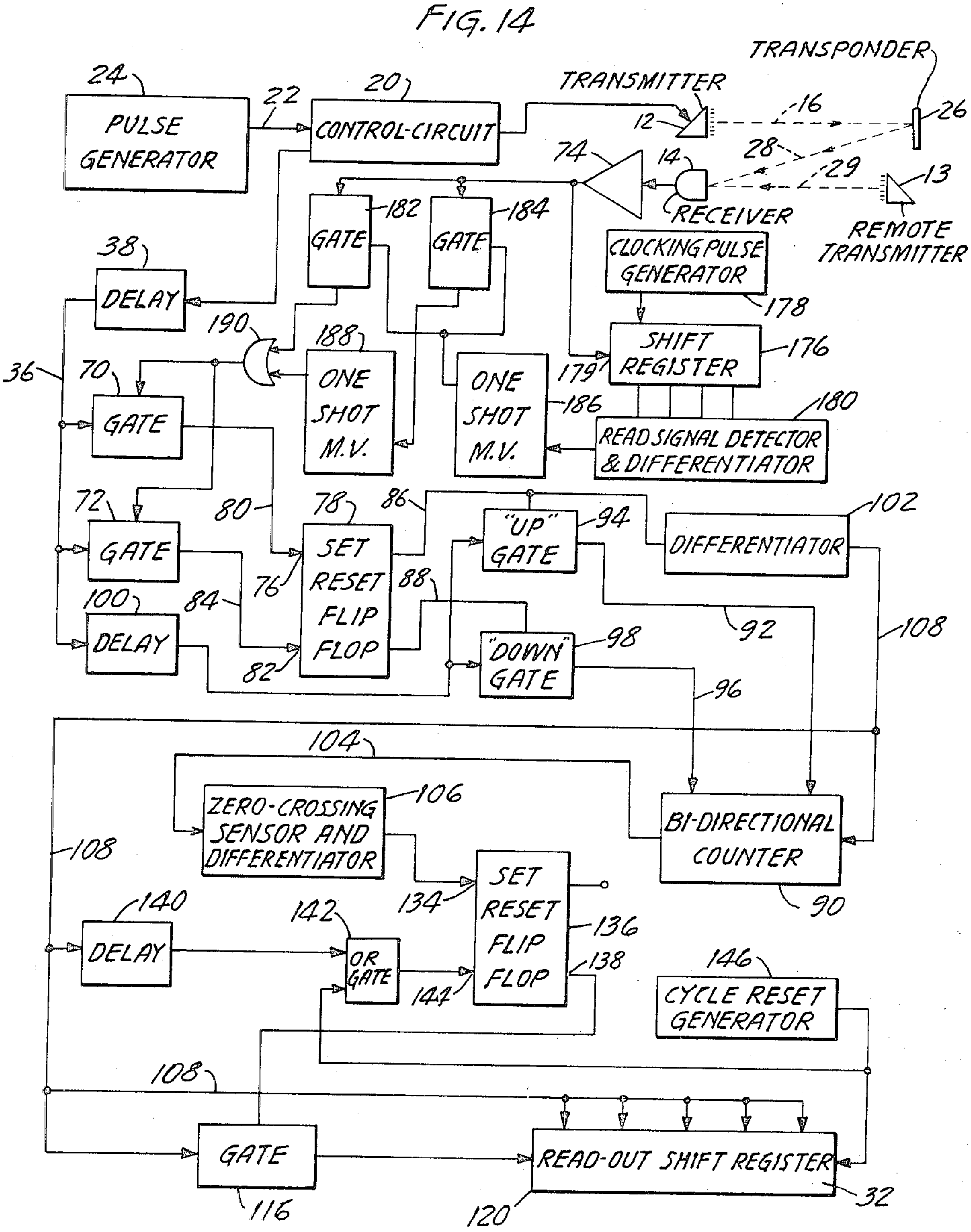
FIG. 14 is a block diagram illustrating a demodulator circuit used for recognizing and demodulating an encoded pulsed beam transmitted from a remotely located transmitter, and also used for demodulating a reflected modulated received beam in accordance with the demodulation method of the circuit of FIG. 7.

Operating on the same principle as the vehicle transceiver 150, the roadway transceivers 170 are mounted overhead above each traffic lane and direct a beam 172 downward as shown in FIG. 12 so as to transmit short coded messages to the vehicle 148 after an identification message has been beamed to its photodiode detector by the upward pyramidal beam of the vehicle 174. In such an embodiment, the transceiver receiver and demodulator are capable of receiving and demodulating both an information-conveying beam reflected from a transponder 152 and an information-encoded beam received from a remote transmitter such as the transmitter of transceiver 170. In FIG. 14 is illustrated a combination having this capability.

In the circuit shown in FIG. 14, a receiver 14 of a transceiver 10 receives, depending on its position, either a modulated beam 28 from a transponder 26 or an encoded beam 29 from a remote transmitter 13. First of all, a recognition must be made as to whether the received signal is from a remote transmitter 13. The received signal is recognized as being in response to a beam 29 from a remote transmitter 13 when shift register 176 acquires a unique predetermined binary recognition signal indicating that the following signal is to be "read." This binary signal is acquired through the clocking pulse generator 178 shifting the contents of the register 176 at essentially the same rate as the pulse rate of the received beam 29. If a "bit" placed in the input 179 of the register 176 in response to a pulse received in beam 28 or 29 is present in the input of register 176 when the shift register 176 is stepped in response a clocking pulse from clocking pulse generator 178, a binary 1 is shifted into register 176; if not a 0 is shifted in.

All pulses received by the receiver 14 are amplified and conducted to the shift register described above and to both gates 182 and 184. If a received signal has not been recognized as being in response to a beam 29 received from a remote transmitter 13, only gate 182 is opened and the pulses go through OR-gate 190 to enable gate 70 for demodulating the received signal as being in response to a beam 28 received from a transponder 26 as described in reference to the decoding system of FIG. 7. If the received signal is recognized as being in response to a beam 29, indicating a direct reception from a remote transmitter 13, it is differentiated in read signal detector 180 and the resultant signal pulse sets the 5-second one-shot multivibrator 186 to close gate 182 and open gate 184 for a period of 5 seconds, or other appropriate time for receipt of a maximum length message. The succeeding pulse train is now sent through gate 184 to a 0.0003-second one-shot multivibrator 188 which passes through OR-gate 190 to enable gate 70 for an interval at least equal to the maximum time possible between any pulse from control circuit 20 and a preceding pulse from the remote transmitter 13. If additional pulses are received through gate 184 before the one-shot multivibrator 188 returns to the reset position, it will be prevented from doing so until 0.0003 second after the last pulse.

By this means the internally generated pulses from control circuit 20 are gated through the demodulator in short and long groups of pulses in accordance with the length of pulse groups sent out by the remote transmitter 13, and decoded in exactly the same way as groups of pulses reflected from a transponder 26.

In this embodiment, pulse generator 24, clocking pulse generator 178, and the remote transmitter each generate pulses at an average rate of approximately 5,000 pulses per second. For the embodiment described, it is necessary that average pulse rates of all three be approximately equal, although other schemes could be used which would permit the separated transmitter to have a generated pulse rate different from that of pulse generator 24. In one preferred embodiment, the aforementioned second code scheme is used to encode both the transmitted beam 16 to convey information and the separately transmitted beam 29 to convey information.

The downward-directed beam 172 can be made narrow and fan-shaped and be positioned perpendicular to the direction of travel in order to read a passive retroreflective coded transponder 192 positioned on the top surface of a vehicle and coded to contain vehicle identification information if this should be deemed advisable as an alternate to actively transmitting vehicle identification numbers. Vehicle identification numbers can be so displayed until transceivers actively transmitting the identification number are installed on all vehicles.

Photodetection receivers 194 are also mounted overhead for receiving information-encoded beams 160 transmitted from vehicle transceivers 150. This highway communication system is capable of transmitting and receiving beams which may be encoded to convey voice communications. A pulse frequency modulation scheme is preferred a for a voice communication system.

When it is desired to limit two-way voice communication to police or emergency use only, private vehicles are equipped to receive only pulse frequency modulated light which has a center frequency of, say, 8,000 p.p.s. but transmits with a center frequency of, say, 5,000 p.p.s. Only police vehicles and emergency roadside receivers are equipped to receive voice transmissions from private vehicles, but all private vehicles, when in range, receive messages from official transmitters at the 8,000 p.p.s. center frequency.

Police in patrol cars overhauling private vehicles are thus able to talk directly with the driver not only to command a stop but for other useful purposes not now practical, such as warnings for minor traffic infractions, advice on observed vehicle safety shortcomings (out-of-alignment, (etc.) or assistance in emergency routing to hospitals and similar situations.

In place of, or alternated with, the identification number transmission a selected code message can be added to the vehicle pulsed-light transmission for reception by roadside receivers. In connection with vehicle locating, it is possible for the central station to not only know the location of each vehicle of interest, but also the identity of its driver. Such a location method is very useful in locating stolen cars or fugitives. In addition, a police patrol car might transmit to roadside receivers a "status" code message such as "Following Speeder—Arrange Interception," in addition to its identification number.

For motorist aid purposes, if the vehicle is within range of a roadside transceiver or receiver, assistance may be requested.

Both the variable portion of the coded sign and the entire operation of the roadway transceiver are fully compatible with all standard methods of data interchange, either through telephone company exchanges or private-line control.

Through the highway communications system of the present nvention there is an orderly and convenient exchange of in-ormation, thereby facilitating coordinated action among user organizations. With such a communications system, all user agencies such as local police, fire departments and hospitals re in direct data and voice contact with the highway communications center serving each community. The latter in turn is ontinually receiving or sending information to all roadway-nstalled highway communications transmitters, transceivers r remotely controlled transponders over private-line data ansmission networks set up in the telephone network.

The present invention is applicable for use in other quivalent transportation communications systems, such as il and water, and can be adapted for use in an aircraft landg communications system.

What is claimed is:

1. A code-reading system for demodulating a signal received in response to scanning an array of elements including a spaced array of first-type clocking elements, first- and second-type code elements positioned between the clocking elements, and second-type spacing elements in accordance with a code whereby a binary 1 is represented by a single first-type code element placed between successive clocking elements, and separated from the clocking elements by second-type spacing elements, each of which first-type code elements is so dimensioned to provide in response to scanning a greater duration of a first-type received signal than the duration of a second-type received signal provided in response to scanning the adjacent following second-type spacing element scanned in the direction of scanning; and a binary 0 is represented by only a single second-type code element placed between successive clocking elements, each of which second-type code elements is so dimensioned that the duration of a second-type received signal provided in response to scanning thereof is greater than the duration of a first-type received signal provided in response to scanning the adjacent preceding clocking element in the direction of scanning, comprising
   - scanning means for scanning the array of elements to provide first-type received signals and second-type received signals in accordance with the coded array;
   - clocking pulse generating means for providing a pulsed clocking signal;
   - comparing means for comparing a said pulsed clocking signal with first-type received signals, which comparing means provides a first-type signal response for each pulse of the clocking signal with which a first-type received signal is coincident and a second-type signal response for each pulse of the clocking signal for which there is no coincident first-type received signal;
   - counting means operatively coupled to the comparing means for counting both successive first-type signal responses and successive second-type signal responses; and
   - output means operatively coupled to the comparing means and to the counting means for providing a binary signal each time a first-type signal response immediately preceded by a second-type signal response is provided from the comparing means, the state of which binary signal is determined by the count of the immediately preceding successive second-type signal responses in relation to the count of the adjacent successive first-type signal responses preceding said immediately preceding second-type signal responses.

2. A code-reading system for demodulating a signal received in response to scanning a coded array of first-type elements and second-type elements wherein the coded array of first-type elements are spaced so that the first-type elements representing coded binary 1's are of greater width in the direction of scanning than the following scanned adjacent second-type elements; and the first-type elements representing coded binary 0's are of shorter width in the direction of scanning than the following scanned adjacent second-type elements, comprising
   - scanning means for scanning the array of elements to provide a received signal in response to scanning a first-type element;
   - clock pulse generating means for providing a pulsed clocking signal;
   - comparing means for comparing a pulsed clocking signal with a received signal, which comparing means provides a first-type signal response for each pulse of a pulsed clocking signal with which a received signal is coincident and a second-type signal response for each pulse of a pulsed clocking signal for which there is no coincident received signal;
   - counting means operatively coupled to the comparing means for separately counting both successive first-type signal responses and successive second-type signal responses; and output means operatively coupled to the comparing means and to the counting means for providing a binary signal each time a first-type signal response immediately preceded by a second-type signal response is provided from the comparing means, the state of which binary signal is determined by the count of the immediately preceding successive second-type signal responses in relation to the count of the adjacent successive first-type signal responses preceding said immediately preceding second-type signal responses.

3. In a communications system wherein a directional radiant energy beam is scanned across an encoded array of radiant energy reflective elements to provide a reflected beam of radiant energy modulated in accordance with the reflective element array, a transceiver-demodulator combination comprising a source of radiant energy;

a pulse generator for providing a pulsed signal;

a control circuit operatively coupled to the pulse generator for producing a pulsed clocking signal representative of said pulsed signal;

transmitting means operatively coupled to the radiant energy source and to the control circuit for transmitting from the radiant energy source in a directional beam pulsed radiant energy representative of said pulsed signal;

radiant energy receiving means proximate to the transmitting means and directed for receiving reflections of a said transmitted beam, which receiving means produces a received signal in response to received radiant energy;

comparing means operatively coupled to the control circuit and to the receiving means for comparing said pulsed clocking signal with a said received signal, which comparing means provides a first-type signal response for each pulse of said pulsed clocking signal with which a said received signal is coincident and a second-type signal response for each pulse of said pulsed clocking signal for which there is no coincident received signal;

counting means operatively coupled to the comparing means for separately counting both successive first-type signal responses and successive second-type signal responses; and output means operatively coupled to the comparing means and to the counting means for providing a binary signal each time a first-type signal response immediately preceded by a second-type signal response is provided from the comparing means, the state of which binary signal is determined by the count of the immediately preceding successive second-type signal responses in relation to the count of the adjacent successive first-type signal responses preceding said immediately preceding second-type signal responses.

4. A transceiver-demodulator combination according to claim 3 for use in a said communications system, wherein said encoded array of reflective elements includes a spaced array of reflective clocking elements, and reflective code elements having nonreflective spacing elements positioned between the clocking elements in accordance with a code whereby a binary 1 is represented by a single reflective code element placed between successive reflective clocking elements, and separated from the reflective clocking elements by nonreflective spacing elements, each of which reflective code elements is so dimensioned to reflect a portion of the scanning bean greater than the portion of the scanning beam not reflected by the adjacent following nonreflective spacing element in the direction of scanning, and a binary 0 is represented by only a single nonreflective code element placed between successive reflective clocking elements, each of which nonreflective code elements is so dimensioned that the portion of the scanning beam not reflected by the nonreflective code element is greater than the portion of the scanning beam reflected by the adjacent preceding clocking element in the direction of scanning; the output means of which transceiver-demodulator combination comprises means for providing a binary 1 in response to each new succession of first-type signal responses when said count of said immediately preceding successive second-type signal responses is not greater than said count of said adjacent successive first-type signal responses;

means for providing a binary 0 in response to each new succession of first-type signal responses when said count of said immediately preceding successive second-type signal responses is greater than said count of said adjacent successive first-type signal responses; and gating means which alternately inhibit and enable the registering of said provided binary number in response to each new succession of first-type signal responses and in response to each count of successive second-type signal responses which is greater than said count of said adjacent successive first-type signal responses.

5. A tranceiver-demodulator combination according to claim 3 for use in a said communications system, wherein said encoded array of reflective elements are spaced so that the leading edges in the direction of scanning of the reflective elements are evenly spaced;

wherein each reflective element representing a coded binary 1 is of greater width in the direction of scanning than a following scanned adjacent nonreflective element; and wherein each reflective element representing a coded binary 0 is of shorter width in the direction of scanning than a following scanned adjacent nonreflective element, the output means of which transceiver-demodulator combination comprises means for providing a binary 1 in response to each new succession of first-type signal responses when said count of said immediately preceding successive second-type signal responses is not greater than said count of said adjacent successive first-type signal responses; and means for providing a binary 0 in response to each new succession of first-type signal responses when said count of said immediately preceding successive second-type signal responses is greater than said count of said adjacent successive first-type responses.

6. A transceiver-demodulator combination according to claim 3, wherein said directional beam is encoded to convey information to a remote receiver, in which combination the control circuit further comprises means for selectively encoding said pulsed signal to convey discrete information, whereby said pulsed clocking signal is representative of said encoded pulsed signal, and whereby said transmitting means transmit encoded pulsed radiant energy representative of said encoded pulsed signal.

7. A transceiver-demodulator combination according to claim 3, wherein said source of radiant energy comprises a source of high-intensity light.

8. In a communications system wherein a directional radiant energy beam is scanned across an encoded array of radiant energy reflective elements to provide a reflected beam of radiant energy modulated in accordance with the reflective element array, a transceiver-demodulator combination comprising a source of radiant energy;

a pulse generator for providing a pulsed signal;

a control circuit operatively coupled to the pulse generator for producing a pulsed clocking signal representative of said encoded pulsed signal;

transmitting means operatively coupled to the radiant energy source and to the control circuit for transmitting from the radiant energy source in a directional beam encoded pulsed radiant energy representative of said encoded pulsed signal;

radiant energy receiving means proximate to the transmitting means and directed for receiving reflections of a said transmitted beam, which receiving means produces a received signal in response to received radiant energy;

comparing means operatively coupled to the control circuit and to the receiving means for comparing said pulsed clocking signal with a said received signal, which comparing means provides a first-type signal response for each pulse of said pulsed clocking signal with which a said received signal is coincident and a second-type signal response for each pulse of said pulsed clocking signal for which there is no coincident received signal;

clock pulse generating means for producing a second pulsed clocking signal having a uniform rate essentially the same as the average rate of the first pulsed clocking signal;

detection means operatively coupled to the receiving means and to the clock pulse generating means for recognizing a received signal produced by the receiving means at essentially the same rate as said second pulsed clocking signal and having a unique predetermined binary recognition characteristic, as a received signal produced in response to a pulsed radiant energy beam from a remote transmitter; and gating means operatively coupled to the detection means and to the comparing means for holding the received signal on a delayed basis, whenever a received signal produced in response to a pulsed radiant energy beam from a remote transmitter is recognized, to enable the comparing means to make said coincidence comparisons between said first clocking signal and a said received signal produced in response to a said pulsed radiant energy beam received from a remote transmitter.

9. A transceiver-demodulator combination according to claim 8, wherein said directional beam is encoded to convey information to a remote receiver, in which combination the control circuit further comprises means for selectively encoding said pulsed signal to convey discrete information, whereby said first pulsed clocking signal is representative of said encoded pulsed signal, and whereby said transmitting means transmit encoded pulsed radiant energy representative of said encoded pulsed signal.

10. A transceiver-demodulator combination according to claim 8 wherein said source of radiant energy comprises a source of high-intensity light.

11. In a communications system wherein a directional light beam is scanned across an encoded array of light-reflective elements to provide a reflected beam of light modulated in accordance with the reflective element array, a transceiver-demodulator combination for providing a said transmitted directional light beam which is encoded to convey information to a remote receiver, comprising a source of high-intensity light;

a pulse generator for providing a pulsed signal;

a control circuit operatively coupled to the pulse generator for selectively encoding said pulsed signal to convey discrete information and for producing a pulsed clocking signal representative of said encoded pulsed signal;

transmitting means operatively coupled to the light source and to the control circuit for transmitting from the light source in a directional beam encoded high-intensity short duration light pulses;

light-receiving means proximate to the transmitting means and directed for receiving reflections of a said transmitted beam, which receiving means produces a received signal in response to received light; and comparing means operatively coupled to the control circuit and to the receiving means for comparing said pulsed clocking signal with a said received signal, which comparing means provides a first-type signal response for each pulse of said pulsed clocking signal with which a said received signal is coincident and a second-type signal response for each pulse of said pulsed clocking signal for which there is no coincident received signal.

12. A communications system wherein a directional radiant energy beam is scanned across an encoded array of radiant energy reflective elements to provide a reflected beam of radiant energy modulated in accordance with the reflective element array and wherein a said transmitted directional beam is encoded to convey information to a remote receiver, which system comprises an encoded array of radiant energy reflective elements;

a source of radiant energy;

a pulse generator for providing a pulsed signal;

a control circuit operatively coupled to the pulse generator for selectively encoding said pulsed signal to convey discrete information and for producing a pulsed clocking signal representative of said encoded pulsed signal;

transmitting means operatively coupled to the radiant energy source and to the control circuit for transmitting from the radiant energy source in a directional beam encoded pulsed radiant energy representative of said encoded pulsed signal;

radiant energy receiving means proximate to the transmitting means and directed for receiving reflections of a said transmitted beam, which receiving means produces a received signal in response to received radiant energy; and comparing means operatively coupled to the control circuit and to the receiving means for comparing said pulsed clocking signal with a said received signal, which comparing means provides a first-type signal response for each pulse of said pulsed clocking signal with which a said received signal is coincident and a second-type signal response for each pulse of said pulsed clocking signal for which there is no coincident received signal.

13. A communications system according to claim 12, in which the source of radiant energy is a high-intensity light source and in which the transmitting means transmits pulsed light from the light source in a directional beam of high-intensity short duration pulses.

14. A communications method wherein a directional radiant energy beam is scanned across an encoded array of radiant energy reflective elements to provide a reflected beam of radiant energy modulated in accordance with the reflective element array, comprising providing radiant energy;

providing a pulsed signal;

transmitting said radiant energy in a pulsed directional beam in response to said pulsed signal;

producing a pulsed clocking signal representative of said transmitted beam;

receiving reflections of a said transmitted beam, and producing a received signal in response to said received radiant energy, comparing said pulsed clocking signal with said received signal to provide a first-type signal response for each pulse of said pulsed clocking signal with which said received signal is coincident and a second-type signal response for each pulse of said pulsed clocking signal for which there is no coincident received signal;

separately counting both successive first-type signal responses and successive second-type signal responses; and providing a binary signal each time a first-type signal response immediately preceded by a second-type signal response is provided in response to the comparing step, the state of which signal is determined by the count of the immediately preceding successive second-type signal responses in relation to the count of the adjacent successive first-type signal responses preceding said immediately preceding second-type signal responses.

15. A communications method wherein a directional radiant energy beam is scanned across an encoded array of radiant energy reflective elements to provide a reflected beam of radiant energy modulated in accordance with the reflective element array, which method comprises providing radiant energy;

providing a pulsed signal;

transmitting said radiant energy in a pulsed directional beam in response to said pulsed signal;

producing a first pulsed clocking signal representative of said transmitted beam;

receiving reflections of a said transmitted beam, and producing a received signal in response to said received radiant energy;

comparing said pulsed clocking signal with said received signal to provide a first-type signal response for each pulse of said pulsed clocking signal with which said received signal is coincident and a second-type signal response for each pulse of said pulsed clocking signal for which there is no coincident received signal;

producing a second pulsed clocking signal having a uniform rate essentially the same as the average rate of the first pulsed clocking signal;

receiving a pulsed energy beam from a remote transmitter and producing a received signal in response to said received pulsed radiant energy beam;

recognizing a received signal produced at essentially the same rate as said second pulsed clocking signal and having a unique predetermined binary recognition characteristic, as a received signal produced in response to a pulsed energy beam received from a remote transmitter; and holding the received signal on a delayed basis, whenever a received signal produced in response to a pulsed energy beam from a remote transmitter is recognized, to enable coincidence comparisons to be made between said first clocking signal and a said received signal produced in response to a said pulsed radiant energy beam received from a remote transmitter.

* * * * *